(12) United States Patent
Yan

(10) Patent No.: US 11,339,879 B2
(45) Date of Patent: May 24, 2022

(54) SEAL ASSEMBLY AND FLUID VALVE

(71) Applicant: Vitesco Technologies GmbH, Hannover (DE)

(72) Inventor: Chunxiao Yan, Schwalbach a Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/046,240

(22) PCT Filed: Apr. 8, 2019

(86) PCT No.: PCT/EP2019/058760
§ 371 (c)(1),
(2) Date: Oct. 8, 2020

(87) PCT Pub. No.: WO2019/197312
PCT Pub. Date: Oct. 17, 2019

(65) Prior Publication Data
US 2021/0033201 A1    Feb. 4, 2021

(30) Foreign Application Priority Data

Apr. 12, 2018    (DE) ............ 10 2018 205 557.2

(51) Int. Cl.
*F16K 5/04*    (2006.01)
*F16K 11/085*    (2006.01)
*F16K 5/06*    (2006.01)
*B60R 16/08*    (2006.01)

(52) U.S. Cl.
CPC .......... *F16K 5/0471* (2013.01); *F16K 5/0407* (2013.01); *F16K 5/0605* (2013.01); *F16K 11/0853* (2013.01); *B60R 16/08* (2013.01)

(58) Field of Classification Search
CPC .. F16K 5/0471; F16K 11/0853; F16K 5/0605; F16K 5/0407; F16K 5/0689; F16K 11/0873; F16K 11/085
See application file for complete search history.

(56) References Cited

U.S. PATENT DOCUMENTS 2,076,841 A    4/1937    Heggem
2,200,474 A    5/1940    Heggem
(Continued)

FOREIGN PATENT DOCUMENTS

CN    1346428    4/2002
CN    205824276    12/2016
(Continued)

OTHER PUBLICATIONS

Machine translation of DE102017004458 (Year: 2017).*
(Continued)

*Primary Examiner* — Michael R Reid
(74) *Attorney, Agent, or Firm* — Cozen O'Connor

(57) ABSTRACT

A seal assembly for use in a fluid valve includes: an actuatable valve body configured to open and close at least one connection of the fluid valve; at least one seal configured to sealingly abut against the valve body at one side of the valve body and to sealingly abut against a valve housing of the fluid valve at another side of the valve body; and at least one elevation from a lateral surface of the valve body integrally formed on the valve body sectionally, the at least one elevation being configured to activate the seal in a closed position of the fluid valve.

9 Claims, 2 Drawing Sheets

(56) References Cited

U.S. PATENT DOCUMENTS

| | | | |
|---|---|---|---|
| 3,473,554 A | 10/1969 | King | |
| 4,542,878 A * | 9/1985 | Kulisek | F16K 5/0605 |
| | | | 251/315.13 |
| 4,848,398 A * | 7/1989 | Leach | F16K 5/0605 |
| | | | 137/556.3 |
| 5,482,253 A | 1/1996 | Ingolf | |
| 6,485,000 B1 | 11/2002 | Ingolf | |
| 2005/0034771 A1 | 2/2005 | Minnick | |
| 2006/0202149 A1* | 9/2006 | Muddiman | F16K 5/188 |
| | | | 251/309 |
| 2011/0309280 A1 | 12/2011 | Wincek | |
| 2015/0316157 A1* | 11/2015 | Zikeli | B29C 48/2552 |
| | | | 264/328.1 |

FOREIGN PATENT DOCUMENTS

| | | |
|---|---|---|
| CN | 206280528 | 6/2017 |
| CN | 206830878 | 1/2018 |
| DE | 10 2006 032 584 | 1/2008 |
| DE | 10 2017 004 458 | 11/2017 |
| DE | 11 2016 001 609 | 1/2018 |
| DE | 10 2017 102 897 | 7/2018 |
| EP | 3 009 719 | 4/2016 |
| JP | 2016-138626 | 8/2016 |
| WO | WO 87/00598 | 1/1987 |

OTHER PUBLICATIONS

International Search Report issued in corresponding PCT Application PCT/EP2019/058760 dated Jun. 26, 2019.

Written Opinion issued in corresponding PCT Application PCT/EP2019/058760 dated Jun. 26, 2019.

Office Action issued in corresponding German application No. DE 10 2018 205 557.2 dated Nov. 19, 2018.

Office Action dated Dec. 10, 2021 issued in Chinese Patent Application No. 201980024996.0.

* cited by examiner

SEAL ASSEMBLY AND FLUID VALVE

CROSS REFERENCE TO RELATED APPLICATIONS

This is a U.S. national stage of International application No. PCT/EP2019/058760, filed on Apr. 8, 2019, which claims priority to German Application No. 10 2018 205 557.2, filed Apr. 12, 2018, the content of each of which is incorporated herein by reference.

BACKGROUND OF THE INVENTION

1. Field of the Invention

The present invention relates to a seal arrangement (i.e., assembly) and to a fluid valve or fluid control valve having such a seal. A fluid valve or fluid control valve is to be understood here as meaning in particular a cooling-water valve or cooling-water control valve, in particular for use in a vehicle. A vehicle is to be understood here as meaning any type of vehicle which has to be supplied with a liquid and/or gaseous fuel for operation, but in particular passenger motor vehicles and/or utility vehicles. Furthermore, the vehicle may also be a partially electric or fully electric vehicle, but in particular passenger motor vehicles and/or utility vehicles.

2. Description of the Prior Art

Seals as such can have different roles. They can, for example, serve to prevent or at least to limit undesired fluid losses. A fluid can be understood here as meaning a liquid and/or gaseous medium.

SUMMARY OF THE INVENTION

An object of the present invention is to provide a seal arrangement for use in a fluid valve, in particular in the form of a cooling-water valve, in particular for use in a vehicle, wherein the intention is for the seal arrangement to meet the highest requirements for long-term leak-tightness under known large temperature variations of a combustion engine periphery and/or an electric motor periphery. Moreover, the seal arrangement should be inexpensive to produce, and should make possible force- and friction-optimized operation of the fluid valve.

This object may be achieved by a seal arrangement for use in a fluid valve that includes:
 an actuatable valve body for opening and closing at least one connection of the fluid valve, and
 at least one seal for sealing abutment against the valve body at one side and for sealing abutment against a valve housing of the fluid valve at the other side.

Here, integrally formed on the proposed valve body sectionally is at least one elevation from the valve body lateral surface for activating the seal in a closed position of the fluid valve.

The elevation is to be understood here as meaning a contour or raised contour of the valve body that protrudes from the valve body lateral surface, or is raised therefrom, in order to interact, in a manner dependent on a valve body position, with the assigned seal. In a closed position of the valve body—this simultaneously being a closed position of the fluid valve—the contour presses against a contact point, having linear and/or areal sealing action, of the seal. As a result, the seal, which as such is elastically deformable owing to the interaction with the valve body, is compressed and braced. This in turn is associated with an activation of the seal, which as such applies its complete sealing action for the first time through this elastic deformation. By contrast, outside this closed position, the seal undergoes relief of tension since outside this closed position it does not interact with the elevated contour, because the sealing action is not required outside this closed position.

The proposed elevation or elevated contour of the valve body lateral surface thus makes possible force- and friction-optimized operation of the fluid valve. This in turn is associated with relatively low current or energy consumption on the part of an actuator for controlling the fluid valve, and this in turn counteracts self-heating of the actuator and is consequently favorable in terms of its service life.

Moreover, the proposed elevation or elevated contour facilitates the fitting of a fluid valve having the above-described seal arrangement.

The surface of the contour is, together with its transitions to that portion of the valve body having the contour, advantageously configured here to be smooth to such an extent that the seals are not damaged when interacting with the contour.

According to one embodiment, the elevation may advantageously be integrally formed in a closed encircling manner on the valve body lateral surface. This brings about uniformly elastic deformation of the seal along the circumferential extent thereof, that is to say uniform activation of the seal along the circumferential extent thereof.

According to a further embodiment, that portion of the valve body having the elevation may be of spherical form. This is associated with particularly good sealing action of the seal arrangement. In principle, the valve body may however also be of cylindrical or substantially cylindrical form or even have a different shaping, for example a sectionally spherical and/or cylindrical shaping. Another differently convex curvature of that portion of the valve body having the elevation is in principle also conceivable.

According to a further embodiment, a face side, facing the valve body, or a face-side end, facing the valve body, of the seal may be set at an angle or inclined with respect to a longitudinal direction of the seal in a manner corresponding to the shaping of the valve body. Here, the face side or the face-side end may include an angle of approximately 45° to 75° with the longitudinal direction. This too is favorable for the sealing action of the seal arrangement.

Also proposed is a fluid valve having a seal arrangement of the above-described type for sealing off at least one connection region of the fluid valve, in particular in the form of a multi-way fluid valve—which can function as a mixing valve and/or distributor valve. A fluid valve may however in principle also be understood as meaning a switching valve, shut-off valve and the like.

The use of a fluid valve of this type as a cooling-water valve, in particular of a vehicle, is also proposed. Here, the cooling-water valve may have the function of a mixing valve, distributor valve, switching valve, shut-off valve and/or the like.

BRIEF DESCRIPTION OF THE DRAWINGS

The invention will be explained in detail in the following text with reference to the illustrations in the figures. Further advantageous refinements of the invention will emerge from the following detailed description of a proposed embodiment. In the drawings.

DETAILED DESCRIPTION OF THE PRESENTLY PREFERRED EMBODIMENTS

Figure 1:
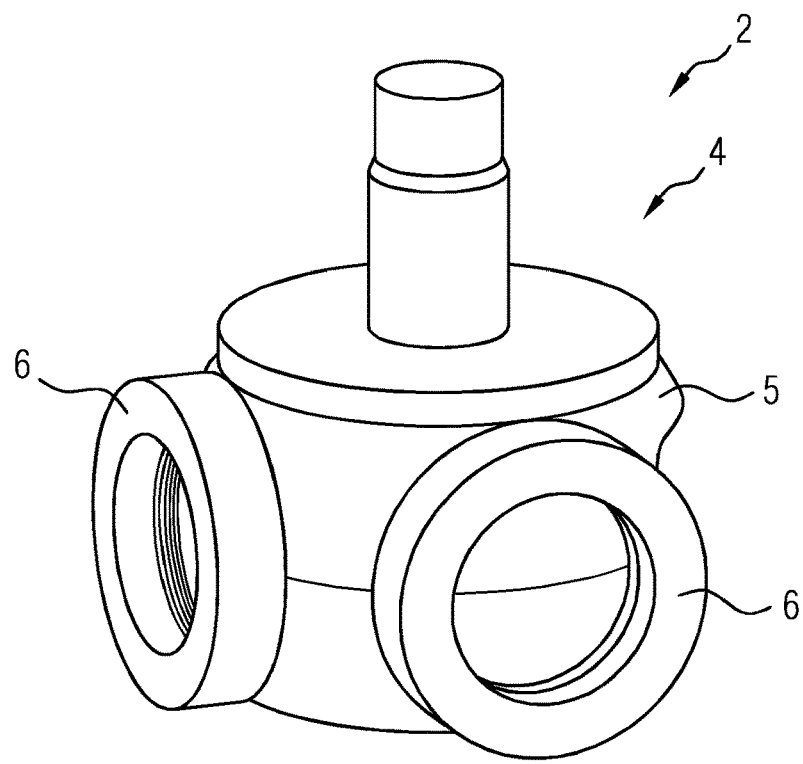
FIG. 1 shows an embodiment of a proposed seal arrangement in a perspective view.

FIG. 1 illustrates a seal arrangement (assembly) 2 for use in a cooling-water valve or cooling-water control valve—or also referred to as cooling-water regulating valve—of a vehicle. Here, the seal arrangement 2 comprises an actuatable valve body 4, which is formed from a plastic, for example by injection molding, and a total of two or three seals 6. The valve body 4 may be formed here, for example, from a PA66, PPA or PPS plastic.

Here, that portion 5 of the valve body 4 against which the seals 6 bear is advantageously of spherical form. In principle, the portion 5 may be of cylindrical and/or spherical form. Here, the convex curvature of the portion 5 may also deviate from a classical spherical shape.

Figure 2:
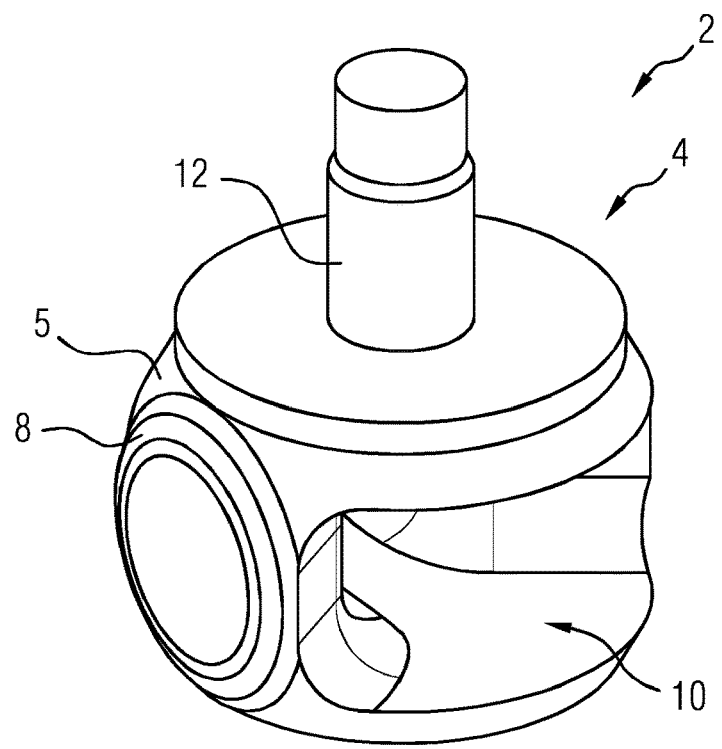
FIG. 2 shows the proposed valve body, shown in FIG. 1, of the seal arrangement in a perspective view.

FIG. 2 illustrates a closed encircling elevation or raised contour 8, which is integrally formed on the valve body portion 5 sectionally and which, as such, with the shape of a circular ring and in a manner corresponding to the in each case assignable, circular ring-shaped seals 6, protrudes from the lateral surface of the valve body portion 5 or is raised from said lateral surface. Here, the valve body 4 is, for example, formed in one piece with a shaft 12 which is integrally formed on the valve body portion 5. At its free end, the shaft 12 bears a multi-spline profile via which the valve body 4 is actuatable in a manner electromotively pivotable in at least one direction, but preferably in two directions, that is to say clockwise and/or counterclockwise, by an actuator into which the shaft 12 projects. A passage 10, which is formed in the valve body portion 5 and through which cooling water flows, can also be seen.

Figure 3:
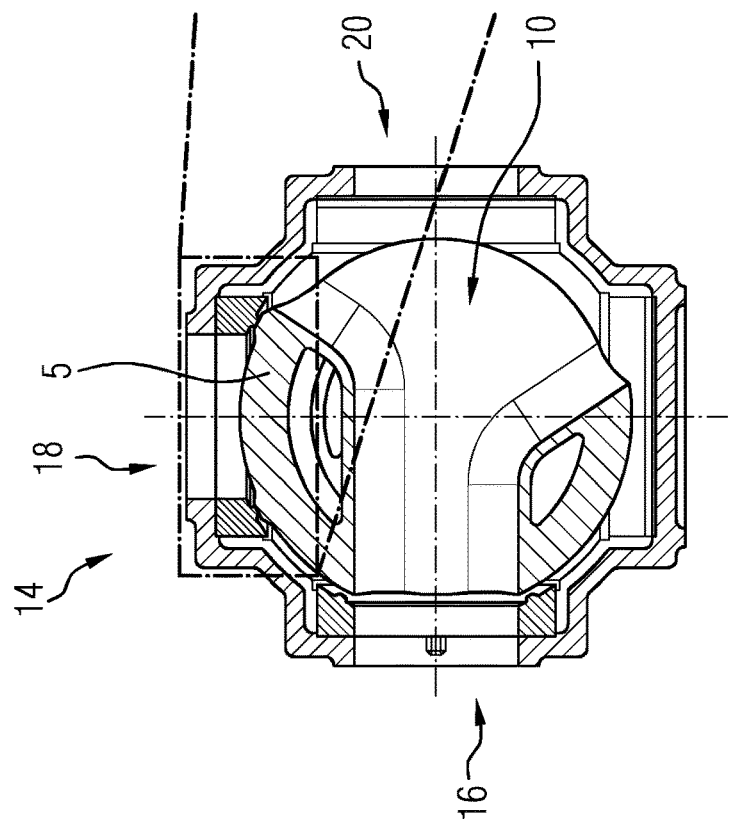
FIG. 3 shows a multi-way fluid valve in a sectional illustration with the seal arrangement shown in FIG. 1.

FIG. 3 illustrates by way of example a multi-way cooling-water valve 14 having a total of three connections 16, 18, 20, which need to be opened or closed and sealed according to requirement. Here, the valve body 4, with respect to the connection 18, is visually depicted in a closed position, in which the connection 18 is closed and completely sealed off by the valve body portion 5. In this illustrated position of the valve body 4, the cooling water can flow through the open connections 16, 20 and via the passage 10. For the sake of simplicity, only two of a total of three possible seals 6 are illustrated in FIG. 3. In principle, the third (non-illustrated) seal 6 can also be dispensed with in this exemplary embodiment. Here, FIG. 3 illustrates that only with respect to the closed connection 18 is the valve body portion 5 operatively connected, via the elevation 8 thereof, to the assigned seal 6. By contrast, with respect to the other connections 16, 20, which are open in this position of the valve body 5, this operative connection does not exist because the sealing action of the in each case assigned seals 6 is not required in this position of the valve body 5.

Figure 4:
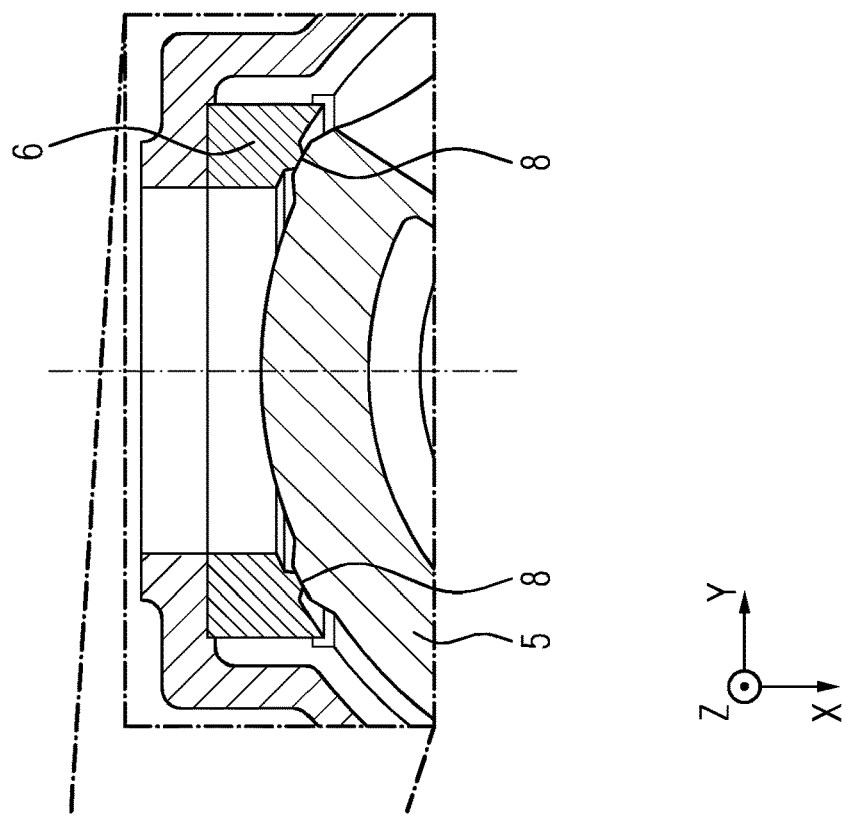
FIG. 4 shows an enlarged detail from FIG. 3.

The interaction between the elevation 8 and a face side, facing the valve body portion 5, of the seal 6 can be seen in particular in FIG. 4. Here, the seal 6 is elastically deformed by the valve body portion 5. The seal 6 is, for example, formed in one piece and comprises an elastically deformable plastic base part, for example composed of an elastomer, for example of EPDM (EPDM standing here for ethylene propylene diene monomer), on the valve body-side, first face side of which for example a thin hard plastic layer is vulcanized. This hard plastic layer, which functions as a hard sealing element, may be manufactured, for example, from PTFE (PTFE standing here for polytetrafluoroethylene) and/or the like. The valve body-side face side of the seal 6 moreover advantageously comprises a circular ring-shaped closed encircling bead which interacts with the elevation 8 with static and linear and/or areal sealing action. In the region of the bead, the thin hard plastic layer is shaped in a manner complementary to the plastic base part, wherein the plastic base part extends into the hard plastic layer and in the process forms the bead. By contrast, the opposite, second face side of the seal 6, which may likewise be provided with a bead, bears with dynamic and linear and/or areal sealing action against a valve housing of the fluid valve 14. The seal 6 furthermore advantageously comprises a support ring composed of plastic or metal, which, relative to the passage opening of the seal 6, bears on the inner side or internally against the plastic base part and makes possible a stable installation of the seal 6 into the valve housing.

In principle, the seal arrangement 2 illustrated by FIGS. 1, 3 and 4 cannot be reduced to the seal 6 described. Rather, this seal 6 described is to be understood merely as an example, because the valve body 4, 5 proposed in the context of the present disclosure is also able to be combined with other seal designs, which as such are advantageously able to be elastically deformed, and thus activated, by the valve body 4, 5.

The elevation or raised contour 8 of the valve body portion 5 acts like a step which needs to be overcome when one of the connections 16, 18, 20 is closed and sealed. Here, the contour 8 is pressed against a contact point, having linear and/or areal sealing action, of the assigned seal 6, whereby the seal 6 is elastically deformed and in the process compressed and braced. This in turn is associated with an activation of the seal, which as such applies its complete sealing action for the first time through this elastic deformation. By contrast, outside this closed position, the seal 6 undergoes relief of tension, since it is not operatively connected to the valve body 5, because then the sealing action is not required. Here, the elevation or contour 8 is expediently designed to be smooth or smooth and slidable to such an extent that it cannot damage the in each case assignable seals 6 when interacting therewith.

The proposed valve body 4, 5 thus makes possible force- and friction-optimized operation of the fluid valve 14. This in turn is associated with relatively low current or energy consumption on the part of the aforementioned actuator unit for controlling the fluid valve, and this in turn counteracts self-heating of the actuator unit and is consequently favorable in terms of its service life.

Although exemplary embodiments have been explained in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

The invention claimed is:

1. A seal assembly (2) for use in a fluid valve (14) having a valve housing and at least one connection, the seal assembly (2) comprising:

an actuatable valve body (4, 5) configured to, when installed in the fluid valve, open and close the at least one connection;

at least one seal (6) configured to:
sealingly abut against the valve body (5) and, when the at least one seal (6) and the valve body (5) are installed in the housing of the fluid valve, to also sealingly abut against the valve housing of the fluid valve; and at least one elevation (8) from a lateral surface of the valve body integrally formed on the valve body (5) sectionally, the at least one elevation (8) being configured to, when the valve body (5) is arranged in the housing of the fluid valve, activate the seal (6) in a closed position of the fluid valve (14), wherein the seal (6) comprises an elastically deformable plastic base part, composed of an elastomer, and further comprises a vulcanized rigid plastic layer, which forms a circular annular closed encircling bead configured to interact with the elevation (8) with a static and linear and/or areal sealing action.

2. The seal assembly as claimed in claim 1, wherein the elevation (8) is integrally formed in a closed encircling manner on the valve body lateral surface.

3. The seal assembly as claimed in claim 2, wherein the portion (5) of the valve body (4) having the elevation (8) is of cylindrical or spherical form.

4. The seal assembly as claimed in claim 1, wherein a face side, facing the valve body (5), of the seal (6) is set at an angle with respect to a longitudinal direction (X X) of the seal (6) in a manner corresponding to the shaping of the valve body (5).

5. The seal assembly as claimed in claim 4, wherein the face side includes an angle of 45° to 75° with the longitudinal direction (X-X).

6. A fluid valve having the seal assembly (2) as claimed in claim 1, the seal assembly (2) being configured to seal off at least one connection region of the fluid valve.

7. The fluid valve as claimed in claim 6, wherein the fluid valve comprises a multi-way fluid valve.

8. The fluid valve as claimed in claim 6, wherein the fluid valve comprises a cooling-water valve.

9. The fluid valve as claimed in claim 6, wherein the fluid valve comprises a cooling-water valve of a vehicle.

* * * * *